US012244476B1

(12) United States Patent
Eldar

(10) Patent No.: US 12,244,476 B1
(45) Date of Patent: Mar. 4, 2025

(54) INTEGRATION OF DATA EXCHANGE OPERATIONS AND REPORTING OPERATIONS

(71) Applicant: DISH Wireless L.L.C., Englewood, CO (US)

(72) Inventor: Eran Eldar, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/518,059

(22) Filed: Nov. 22, 2023

Related U.S. Application Data

(60) Provisional application No. 63/593,816, filed on Oct. 27, 2023.

(51) Int. Cl.
*H04L 43/06* (2022.01)
*H04W 24/10* (2009.01)

(52) U.S. Cl.
CPC ............. *H04L 43/06* (2013.01); *H04W 24/10* (2013.01)

(58) Field of Classification Search
CPC ................................ H04L 43/06; H04L 24/10
See application file for complete search history.

(56) References Cited

U.S. PATENT DOCUMENTS

| | | | | |
|---|---|---|---|---|
| 6,105,063 A | * | 8/2000 | Hayes, Jr. ............... | G06F 9/451 709/228 |
| 7,085,834 B2 | * | 8/2006 | Delany .................... | G06F 21/41 707/999.009 |
| 8,490,152 B2 | * | 7/2013 | Staiman ............. | G06Q 10/0631 726/1 |
| 9,467,726 B1 | * | 10/2016 | Le-Chau .......... | H04N 21/26225 |
| 11,165,785 B1 | * | 11/2021 | Karppanen ........... | H04L 63/104 |
| 11,281,442 B1 | * | 3/2022 | Tal .......................... | H04L 67/51 |
| 2002/0177448 A1 | * | 11/2002 | Moran .................... | H04L 43/50 455/466 |
| 2020/0136889 A1 | * | 4/2020 | Chen ....................... | H04L 41/22 |
| 2022/0179985 A1 | * | 6/2022 | Veeramachaneni ......................... | G06F 21/6218 |

* cited by examiner

*Primary Examiner* — John M Macilwinen
(74) *Attorney, Agent, or Firm* — Baker Botts L.L.P.

(57) ABSTRACT

An apparatus comprises a memory and a processor communicatively coupled to one another. The memory may be configured to store one or more data exchange operations and one or more reporting operations. The processor may be configured to identify a recipient configured to receive a report, and match the recipient to entitlements in a service directory. The entitlements indicating data object information for a data object associated with the recipient. Further, the processor is configured to obtain a category information associated with the recipient. The category information indicating that the recipient is part of an affinity group. The processor may be configured to determine a data object modification for the data object information based at least in part upon the category information, generate the report comprising the entitlements and the data object modification, and generate the report comprising the entitlements and the data object modification.

20 Claims, 3 Drawing Sheets

INTEGRATION OF DATA EXCHANGE OPERATIONS AND REPORTING OPERATIONS

RELATED APPLICATION AND CLAIM TO PRIORITY

This application claims priority to U.S. Provisional Application No. 63/593,816 filed Oct. 27, 2023, and titled "INTEGRATION OF DATA EXCHANGE OPERATIONS AND REPORTING OPERATIONS," which is incorporated herein by reference.

TECHNICAL FIELD

The present disclosure relates generally to performing data exchange operations and reporting operations in a communication system, and more specifically to integration of data exchange operations and reporting operations.

BACKGROUND

In some wireless communications systems, users may be enabled to perform one or more operations associated with one or more services operating within sub-systems of the wireless communications systems. The users may receive requests to transmit data or data objects to maintain access to these sub-systems. In this regard, if the users do not transmit the requested data or data objects, access to the one or more sub-systems may be stopped.

SUMMARY OF THE DISCLOSURE

In one or more embodiments, systems and methods disclosed herein integrate data exchange operations and reporting operations. In particular, the systems and methods may be configured to generate reports requesting data object information from one or more recipients. The data object information may comprise values of data objects to be exchanged between the one or more recipients and an apparatus configured to receive the data objects. The systems and methods may perform one or more data exchange operations configured to analyze entitlements associated with the recipient and assign data object information to each entitlement. The entitlements may be configured to provide one or more connectivity allowances (e.g., access, use, modification, and the like) between one or more user equipment associated with the one or more recipients and one or more network resources in a wireless communication network. The systems and methods may perform one or more reporting operations configured to obtain category information that associate the recipients to one or more affinity groups and one or more tier lists. Further, the reporting operations may comprise generating data object modifications to the data object information based on the affinity groups and/or the tier lists associated with the recipients. At this stage, the systems and methods may be configured to generate a report to the recipients indicating the entitlements and the data object modifications.

In one or more embodiments, the systems and methods described herein are integrated into a practical application of integrating data exchange operations performed by a data exchange system and reporting operations performed by a reporting system. In particular, the practical application comprises generating data object modifications by the reporting system for the data object information corresponding to the entitlements analyzed by the data exchange system. In this regard, the systems and methods provide the practical applications of: (1) generating the data object modifications based at least in part upon category information associated with the recipients; (2) generating the data object modifications based at least in part upon tier information from tier lists comprised in the category information; (3) automatically integrating data object modifications for data object information for each entitlement in the report; and (4) transmitting the report to the recipient upon modifications of the data object information for each entitlement.

In addition, the systems and methods described herein are integrated into a technical advantage of increasing processing speeds in a computer system, because processors associated with the systems and methods are configured to combine data exchange operations and reporting operations before reports are provided or transmitted to the recipients. The systems and methods may generate reports comprising any data object modifications to data object information corresponding to each entitlement without requiring additional processing by third-parties or organizations. In this regard, the systems and methods described herein are integrated into the practical application of reducing and/or eliminating delays caused by third parties configured to process data object information because the systems and the methods integrate data exchange systems that determine the data object information and reporting systems that modify the data object information before reports are generated.

In one or more embodiments, the system and the method may be performed by an apparatus, such as a server, communicatively coupled to multiple network components in a core network, one or more base stations in a radio access network, and one or more user equipment. Further, the system may be a wireless communication system, that comprises the apparatus. In addition, the system and the method may be performed as part of a process performed by the apparatus communicatively coupled to the network components in the core network. As a non-limiting example, the apparatus may comprise a memory and a processor communicatively coupled to one another. An apparatus comprises a memory and a processor communicatively coupled to one another. The memory may be configured to store one or more data exchange operations configured to indicate one or more data objects to be exchanged with at least one recipient and one or more reporting operations configured to generate one or more data object modifications comprising modifications to the one or more data objects to be exchanged with the at least one recipient. The processor may be configured to identify a recipient configured to receive a report, and match the recipient to entitlements in a service directory. The entitlements indicating data object information for a data object associated with the recipient. Further, the processor is configured to obtain a category information associated with the recipient. The category information indicating that the recipient is part of an affinity group. The processor may be configured to determine a data object modification for the data object information based at least in part upon the category information, generate the report comprising the entitlements and the data object modification, and generate the report comprising the entitlements and the data object modification.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
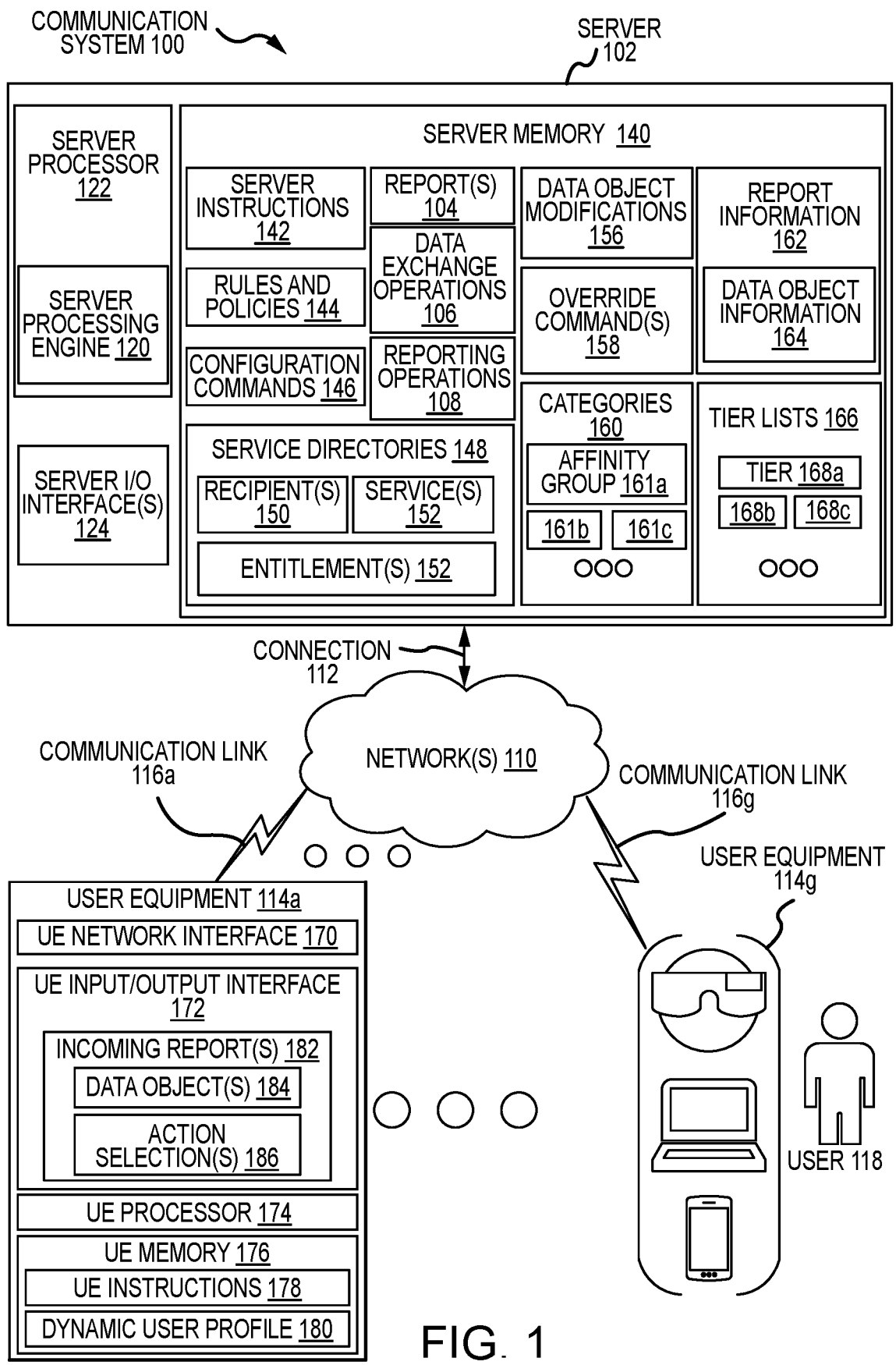
FIG. 1 illustrates an example communication system in accordance with one or more embodiments.
Figure 2:
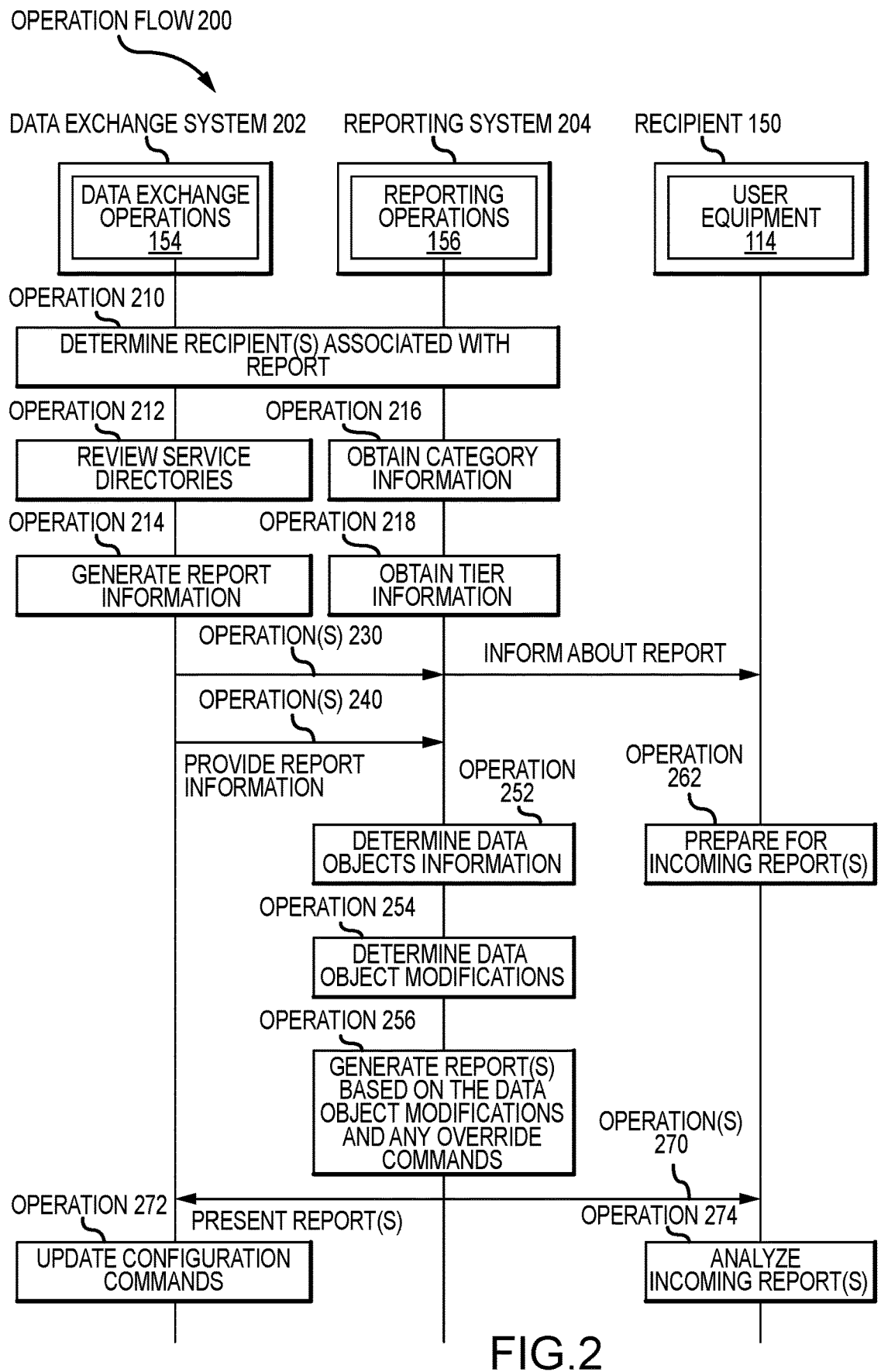
FIG. 2 illustrates an example operation flow performed in conjunction with the example communication system of FIG. 1.
Figure 3:
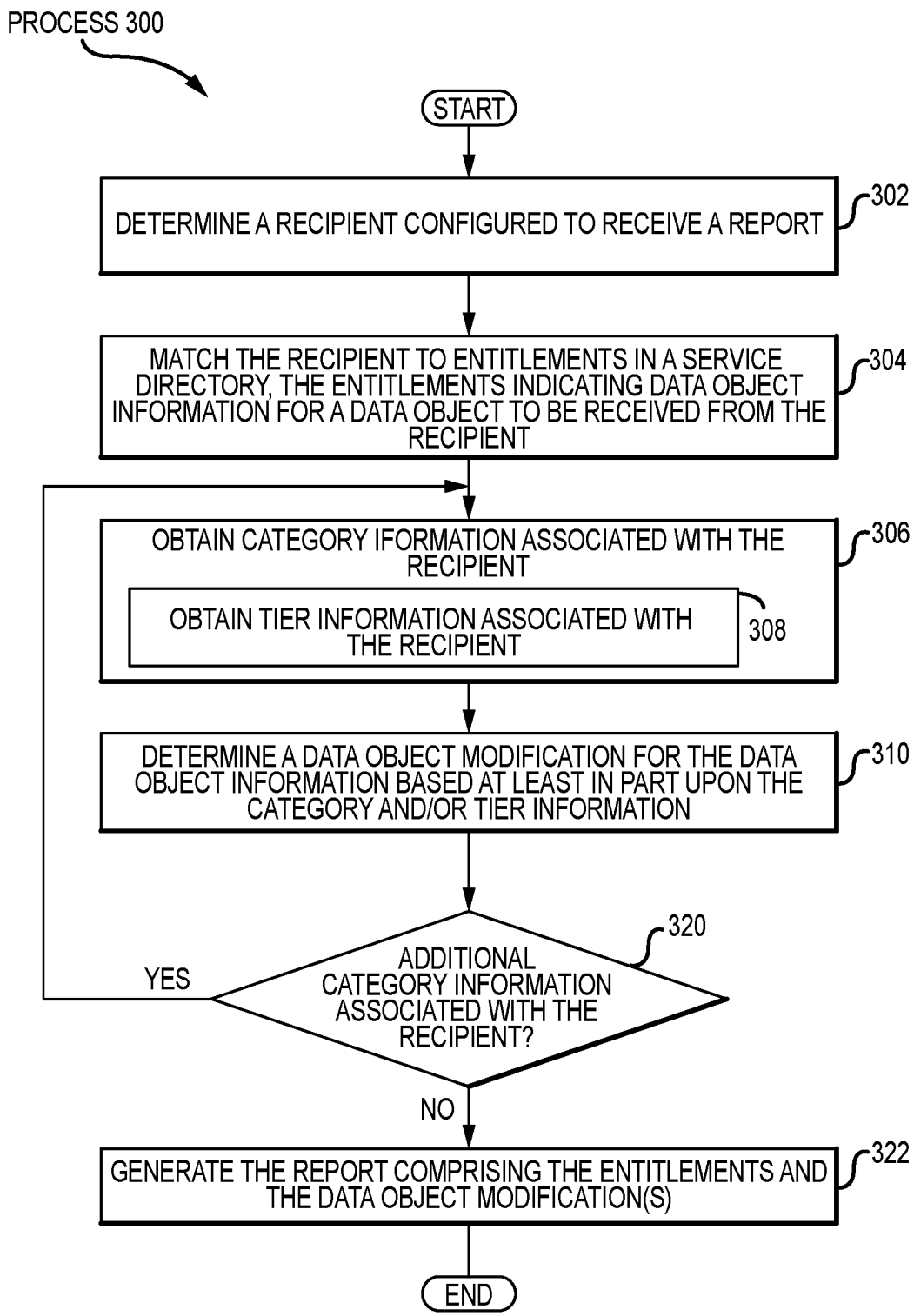
FIG. 3 illustrates an example flowchart of a method to integrate data exchange operations and reporting operations in conjunction with the operational flow of FIG. 2.

In one or more embodiments, recipients may comprise one or more user equipment configured to perform one or more operations in a wireless communication system. Once provisioned, the user equipment may be associated with one or more entitlements. The systems and methods may comprise a data exchange system configured to perform data exchange operations and a reporting system configured to perform reporting operations. As described above, this disclosure provides various systems and methods configured to integrate the one or more data exchange operations and the one or more reporting operations to generate reports to the recipients. FIG. 1 illustrates a communication system 100 in which a server 102 integrates one or more operations to reduce delays while generating reports 104. FIG. 2 illustrates an operational flow 200 performed by the communication system 100 of FIG. 1. FIG. 3 illustrates a process 300 performed by the communication system 100 of FIG. 1.

Communication System Overview

FIG. 1 illustrates a diagram of a communication system 100 (e.g., a wireless communication system) that comprises a server 102 configured to integrate data exchange operations 106 and reporting operations 108 configured, in accordance with one or more embodiments. In the communication system 100 of FIG. 1, the server 102 may be communicatively coupled to one or more networks 110 via one or more connections 112. In FIG. 1, the server 102 is communicatively coupled to multiple user equipment 114a-114g (collectively, user equipment 114) via multiple corresponding communication links 116a-116g (collectively, communication links 116) established between each user equipment 114 and the networks 110. As represented by a user equipment 114g, the user equipment 114 may be operated or attended to by one or more users 118. In the example of FIG. 1, the server 102 may be communicatively coupled to multiple additional devices in the communication system 100. While FIG. 1 shows the server 102 connected directly to the one or more networks 110 via the one or more connections 112, the server 102 may be located inside one of the networks 110 as part of one or more of the network components (e.g., not shown).

In one or more embodiments, the communication system 100 comprises the user equipment 114, the one or more networks 110, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such as (e.g., Sub 6 GHZ). The communication system 100 may comprise a large number of antennas. In some embodiments, the communication system may perform one or more monitoring operations and/or sensing operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data and communicate with the networks 110 and the user equipment 114. The server 102 may be configured to monitor, track data, control routing of signals, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, and a server memory 140 communicatively coupled to one another. The server 102 may be configured as shown, or in any other configuration.

The server processor 122 may comprise one or more processors operably coupled to and in signal communication with the one or more server I/O interfaces 124, and the server memory 140. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 142 from the server memory 140 and executes the server instructions 142 by directing the coordinated operations of the ALU, registers and other components via the server processing engine 120. The server processor 122 may be configured to execute various instructions. For example, the server processor 122 may be configured to execute the server instructions 142 to perform functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 124 may be hardware configured to enable one or more operations 210-292 described in reference to FIG. 2 and one or more banner operations 302-322 described in reference to FIG. 3. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may be configured to comprise one or more peripherals such as a network interface, one or more administrator interfaces, and one or more displays. The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components in a core network, the user equipment 114, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces may be part of the server I/O interfaces 124 may be user interfaces configured to provide access and control to of the server 102 to one or more users (e.g., the user 118) or electronic devices. The one or more users may access the server memory 140 upon confirming one or more access credentials (e.g., a user profile) to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 114.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In some embodiments, the server processor 122 may be configured to integrate the data exchange operations 106 and the reporting operations 108. The server processor 122 may be configured to perform the data exchange operations 106 and the reporting operations 108 simultaneously, sequentially, or in combination. The server processor 122 may be configured to alternate between the data exchange operations 106 and the reporting operations 108 in real-time. In some embodiments, "real-time" may refer to immediate or near immediate (e.g., within one or two seconds) change of operations. For example, an operation B may be considered to occur in real-time response to an operation A in a case where operation B occurs within a second after operation A. In other embodiments, "real-time" may refer to operations that occur in immediate response to triggering operations even in cases where responding operations occur several minutes after triggering operations.

The server memory 140 may be volatile or non-volatile and may comprise a read-only memory (ROM), random-access memory (RAM), ternary content-addressable memory (TCAM), dynamic random-access memory (DRAM), and static random-access memory (SRAM). The server memory 140 may be implemented using one or more disks, tape drives, solid-state drives, and/or the like. The server memory 140 is operable to store the server instructions 142, one or more rules and policies 144, one or more configuration commands 146, one or more service directories 148 comprising one or more recipients 150 of one or more services 152 and one or more entitlements 154 allowed to the recipients 150 by the services 152, the one or more reports 104, the one or more data exchange operations 106, the one or more reporting operations 108, one or more data object modifications 156, one or more override commands 158, one or more categories 160 comprising an affinity group 161a, an affinity group 161b, and an affinity group 161c (collectively, affinity groups 161), report information 162 comprising data object information 164, and/or tier lists 166 comprising tier 168a, tier 168b, and tier 168c (collectively, tiers 168). In the server memory 140, the server instructions 142 may comprise commands and controls for operating one or more specific network functions (NFs) in the one or more networks 110 when executed by the server processing engine 120 of the server processor 122. The server processing engine 120 may be configured to operate as an invoice engine configured to perform the one or more data exchange operations 106 and/or as a quotation engine configured to perform the one or more reporting operations 108.

In one or more embodiments, the one or more rules and policies 144 are configured to instruct one or more user equipment 114 to establish one or more configuration commands 146 to perform one or more operations in the communication system 100 in a specific order. The one or more rules and policies 144 enable automation of the integration of the data object information 164 and/or the data object modifications 156. For example, the rules and policies 144 may indicate an order of the data object modifications 156 corresponding to the one or more entitlements 154. In some embodiments, the one or more rules and policies 144 may be predetermined and/or dynamically assigned by a corresponding user 118 or an organization associated with the user 118.

In one or more embodiments, the configuration commands 146 are configured to coordinate operations of the user equipment 114. Each configuration command of the configuration commands 146 may be configured to provide control information to perform one or more of the operations in the user equipment 114. Further, the configuration commands 146 may be routing and configuration information that control access to services in the user equipment 114. The configuration commands 146 may be dynamically and/or periodically updated by the network components in the networks 110 or by the server processor 122.

The service directories 148 may be configured to store service-specific information and/or user-specific information. The service directories 148 may enable the server 102 to confirm user credentials to access one or more network components in the networks 110. The service directories 148 may be configured to store provider-specific information and make the information available to the user equipment 114. The service directories 148 may enable the server 102 to validate credentials associated with a specific provider (e.g., a service or application accessed via the networks 110) against corresponding user-specific information in the service directories 148 (e.g., a user profile).

In some embodiments, the data object modifications 156 are recommendations presented to the user equipment 114 based on the report information 162. The data object modifications 156 may comprise modifications to the data object information 164 to be included in the reports 104. In one or more embodiments, the data object modifications 156 are configured to modify a value associated with the data object information 164 before it is added on to a corresponding report 104. Each data object modifications 156 may be configured to periodically and/or dynamically provide changes to the data object information 164. In one or more embodiments, the data object information 164 may comprise a cost associated with providing a given entitlement 154 to a corresponding recipient 150. In this regard, the data object modification 156 may comprise a reduction to the cost associated with the given entitlement 154.

In one or more embodiments, the data object modifications 156 comprises the changes as new configuration commands 146 to be immediately reflected in the reports 104. For example, the data object modifications 156 may be changes to the data object information 164 to be included in a next report 104. The data object modifications 156 may comprise the changes as new configuration commands 146 to be reflected in the reports 104 within a predefined period of time. For example, the data object modifications 156 may be changes to the data object information 164 to be included in a next report 104 after the predefined period of time is lapsed. The data object modifications 156 may comprise the changes as new configuration commands 146 to be reflected in the reports 104 for a predefined period of time. For example, the data object modifications 156 may be changes to the data object information 164 to be included in any reports 104 generated over the predefined period of time.

The data object modifications 156 may comprise the changes as new configuration commands 146 to be reflected in the reports 104 for based at least in part upon a triggering command from the configuration commands 146. For example, the data object modifications 156 may be changes to the data object information 164 to be included in a reports 104 based at least in part upon determining that an override command 158 is received. In some embodiments, the data object modifications 156 may maintain, reduce, and/or increase the value of the data object information 164.

In one or more embodiments, the override commands 158 are instructions to create and/or update the data object modifications 156 associated with specific data object information 164. The server processor 122 may be configured to determine whether any override commands 158 are received from the server I/O interfaces 124 and/or whether any override commands 158 may be obtained from the rules and policies 144. Once an override command 158 is identified, the server processor 122 may be configured to determine whether there are any existing data object modifications 156 for the specific data object information 164. If there are any existing data object modifications 156 for the specific data object information 164, the server processor 122 may be configured to trigger one or more updates to the existing data object modifications 156. In some embodiments, the server processor 122 may identify multiple override commands 158 associated with a same specific data object information 164. In this case, the server processor 122 may be configured to evaluate the override commands 158 available for the specific data object information 164 and determine whether to update and/or create data object modifications 156 based on some or all of the override commands 158.

In some embodiments, the categories 160 may comprise the affinity groups 161. The categories 160 may be category information indicating that one or more recipients 150 are part of one or more affinity groups 161. A recipient 150 may be part of multiple categories 160 and/or multiple affinity groups 161 in multiple categories. The recipients 150 may be part of one or more categories 160 and/or affinity groups 161 in accordance with one or more conditions established by the entitlements 154 and the rules and policies 144. For example, the categories 160 may comprise an employee category 160, a customer category 164, a profession category 164, a geolocation category 164, among others. A specific recipient 150 may be associated with one or more of the categories 160. In this regard, the specific recipient 150 may comprise user equipment 114 associated with a user 118 that is both an employee and customer of an organization providing the services 152. Herein, the specific recipient 150 may be comprised in the employee category 160 because the user 118 is an employee of the organization and the customer category 160 because the user 118 is a customer of the organization.

In one or more embodiments, continuing with this example, the affinity groups 161 may be any conditions that group the specific recipient 150 within a specific category 160. Each of the categories 160 may comprise one or more affinity groups 161. Continuing with the previous example, the employee category 160 may comprise a time employed affinity group 161 and employment location affinity group 161 among others. Herein, the time employed affinity group 161 may comprise recipients 150 that are currently employed with the organization providing the entitlements 154 and/or the services 152 and/or may comprise recipients 150 that have been employed with the organization for a predefined range of time (e.g., more than 10 years, between 6 and 10 years, among any other conditions). Further, the employment location affinity group 161 may comprise recipients 150 that are currently employed within a radius of a specific location on Earth (e.g., employee is employed within 50 miles of a specific city, jobsite, office building, and the like). In the example of FIG. 1, while the affinity groups 161a-161c are shown, less or more affinity groups 161 may be included for category 160.

In some embodiments, the report information 162 may comprise data object information 164. The data object information 164 may be tables, lists, or alphanumeric and/or symbol strings configured to convey value. As described above, the data object information 164 may be an indicator that an entitlement 154 is enabled or disabled for a recipient. The data object information 164 may be a value indicating a cost associated with providing one or more services 152 to the recipients 150. The data object information 164 may comprise multiple types of data. For example, the data object information 164 for a specific entitlement 154 may indicate a status in a phrase format (e.g., specific entitlement 154 is enabled, specific entitlement 154 is disabled, and the like) and a cost in numeric format (e.g., cost of fifty, seventy, or any number). In one or more embodiments, the data object information 164 may be representative of data objects to be received from users 118 for storing in one or more data files or for distribution to specified one or more target entities.

In one or more embodiments, the tier lists 166 comprise tiers 168 for one or more of the affinity groups 161. The tiers 168 may be one or more predefined subsections of any of the affinity group 161. The tiers 168 may be tiered conditions that inform possible modifications to the data object information 164 for a specific recipient 150. For example, an affinity group 161 for time employed at an organization within a category 160 for employees of the organization may comprise tiers 168 for different time durations. For another example, a tier 168a may be for recipients 150 that have been employed by the organization for 20 years or more, a tier 168b may be for recipients 150 that have been employed by the organization between 10 and 20 years, and a tier 168c may be for recipients 150 that have been employed by the organization for less than 10 years. In the example of FIG. 1, while the tiers 168a-168c are shown, less or more tiers 168 may be included for each affinity group 161 and/or category 160.

In one or more embodiments, the data exchange operations 106 and the reporting operations 108 may be executed by the server processor 122 to evaluate the categories 160 and the report information 162. Further, the data exchange operations 106 and the reporting operations 108 may be configured to interpret and transform the categories 160 and the report information 162 into structured data sets and subsequently stored as files or tables. The categories 160 and the report information 162 may cleanse, normalize raw data, and derive intermediate data to generate uniform data in terms of encoding, format, and data types. The categories 160 and the report information 162 may be executed to run user queries and advanced analytical tools on the structured data. The categories 160 and the report information 162 may be configured to generate the one or more machine learning algorithms and/or artificial intelligence commands based on current rules and policies 144 and the existing configuration commands 146. In turn, the server processor 122 may be configured to generate the data object modifications 156 based on the outputs of the data exchange operations 106 and the reporting operations 108. The machine learning algorithm and the artificial intelligence commands may be parameters that modify the data exchange operations 106 and the reporting operations 108. The data exchange operations 106 and the reporting operations 108 may be combined with existing server instructions 142 and/or existing configuration commands 146. In one or more embodiments, the data exchange operations 106 and the reporting operations 108 may be periodically and/or dynamically updated.

In one or more embodiments, the data exchange operations 106 may be configured to indicate one or more data objects (e.g., via data object information 164) to be exchanged with at least one recipient 150. The data exchange operations 106 may be configured to generate and analyze the report information 162. Further, the data exchange operations 106 may be configured to provide the report information 162 and any relevant configuration commands 146 to the reporting operations 108.

In one or more embodiments, the reporting operations 108 may be configured to generate one or more data object modifications comprising modifications to the one or more data objects (e.g., via data object information 164) to be exchanged with the at least one recipient 150. The reporting operations 108 may be configured to generate one or more data object modifications 156 to the data object information 164 based at least in part upon the affinity groups 161 in the categories 160 and/or the tiers 168 in the tier lists 166. Further, the reporting operations 108 may be configured to generate one or more reports 104 comprising the entitlements 154 and the data object modifications 156. In some embodiments, the reporting operations 108 may comprise forwarding the reports 104 to the data exchange operations 106. In this regard, the data exchange operations 106 may be configured to save a copy of the reports 104 in the server memory 140 before triggering transmission of the reports 104 to the recipients 150. In other embodiments, the reporting operations 108 may comprise forwarding and/or presenting the reports 104 to the recipient 150 directly and/or via one or more additional operations performed by one or more network components.

In one or more embodiments, the data exchange operations 106 may comprise obtaining report information 162 (e.g., account information) indicating data object information 164 (e.g., costs) associated with providing one or more entitlements 154 by the one or more services 152 and the one or more recipients 150. The data object information 164 may be a baseline value associated with providing the one or more entitlements. In some embodiments, the data exchange operations 106 may provide the report information 162 to the one or more reporting operations 108. At this stage, the reporting operations 108 may be configured to analyze whether to suggest and/or recommend data object modifications 156 based at least in part upon the categories 160 and/or the tier lists 166. In this regard, the reporting operations 108 may comprise modifying (e.g., increasing and/or reducing) the baseline values of the data object information 164.

User Equipment In one or more embodiments, each of the user equipment 114 (e.g., the user equipment 114a and a user equipment 114g representative of the user equipment 114a-114g) may be any computing device configured to communicate with other devices, such as the server 102, other network components in the networks 110, databases, and the like in the communication system 100. The user equipment 114 may be one or more network components associated with one or more recipients 150. Each of the user equipment 114 may be configured to perform specific functions described herein and interact with one or more network components in the networks 110. Examples of user equipment 114 comprise, but are not limited to, a laptop, a computer, a smartphone, a tablet, a smart device, an IoT device, a simulated reality device, an augmented reality device, or any other suitable type of device.

In one or more embodiments, referring to the user equipment 114a as a non-limiting example of the user equipment 114, the user equipment 114a may comprise a user equipment (UE) network interface 170, a UE I/O interface 172, a UE processor 174 configured to execute a UE processing engine (not shown), and a UE memory 176 comprising one or more UE instructions 178 and a dynamic user profile 180. The UE network interface 170 may be any suitable hardware or software (e.g., executed by hardware) to facilitate any suitable type of communication in wireless or wired connections. These connections may comprise, but not be limited to, all or a portion of network connections coupled to additional network components in the networks 110, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more operations in the user equipment 114 upon execution of the server instructions 142 by the server processor 122. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 114a may comprise capabilities for voice communication, mobile broadband services (e.g., video streaming, navigation, and the like), or other types of applications. In this regard, the UE I/O interface 172 of the user equipment 114a may communicate using machine-to-machine (M2M) communication, such as machine-type communication (MTC), or another type of M2M communication.

In one or more embodiments, the UE I/O interface 172 may comprise one or more incoming reports 182. The action reports 182 may be the reports 104 received from the server 102 at the user equipment 114a. The incoming reports 182 may be any objects or shapes in the UE I/O interface 172 comprising text data and image data representative of the reports 104 generated by the server 102. The text data and/or the image data may be static or dynamic. The text data may comprise alphanumeric data strings organized in an organized and/or randomize appearance in the UE I/O interface 172. The image data may be representative of the forms presented in the UE I/O interface 172. For example, the image data may comprise information about videos or images shown in the UE I/O interface 172 via services (e.g., user interface (UI) in applications). In some embodiments, the data objects 184 may be real or simulated data objects exchanged with the incoming reports 182. The action selection 186 may be one or more operations selected by the user equipment 114 in response to the incoming reports 182. For example, the action selections 186 may comprise selections to provide the data objects requested in the incoming reports 182.

In some embodiments, the user equipment 114a is communicatively coupled to one or more of the networks 110 via one or more communication links 116. The user equipment 114a may be a device with cellular communication capability such as a mobile phone, a hand-held device, a computer, a laptop, a tablet, a smart watch or other wearable device, or virtually any type of wireless device. In some applications, the user equipment 114 may be referred to as a UE, UE device, or terminal.

The UE processor 174 may comprise one or more processors operably coupled to and in signal communication with the UE network interface 170, the UE I/O interface 172, and the UE memory 176. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as the UE instructions 178 from the UE memory 176 and executes the UE instructions 178 by directing the coordinated operations of the ALU, registers, and other components via the UE processing engine (not shown). The UE processor 174 may be configured to execute various instructions. For example, the UE processor 174 may be configured to execute the UE instructions 178 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In some embodiments, the dynamic user profile 180 is configured to be a centralized hub for all user profiles associated with the user 118. The dynamic user profile 180 may be configured to actively store credentials and preferences from any services associated with the user equipment 114a. In other embodiments, the dynamic user profile 180 evaluates the service directories 148 and associates the preferences of the user 118 in existing entitlements 154 to actively provide the user equipment 114a with a centralized reference profile that is updated specifically for the user 118. The dynamic user profile 180 may cross-associate user preferences among services (i.e., applications or subscriptions) and any entities frequented by the user 118 (e.g., retail organizations, airlines, restaurants, and the like). In some embodiments, the dynamic user profile 180 may provide access to a data exchange mechanism that the user equipment 114a may leverage to exchange data in endpoint terminals in physical environments and virtual environments. In this regard, the dynamic user profile 180 may provide a universal virtual wallet in the user equipment 114a.

Network

The networks 110 may be a network configured to manage communication sessions for the user equipment 114. In one or more embodiments, the networks 110 may establish connections between user equipment 114 and the server 102 in accordance with one or more communication protocols. In the example of FIG. 1, the networks 110 comprise one or more network components configured to perform one or more NFs. In some embodiments, the networks 110 may comprise a core network that enables the user equipment 114 to communicate with the server 102, or another type of device. The networks 110 may implement a communication method that does not require the establishment of a specific communication protocol connection between the user equipment 114 and one or more of the networks 110. The networks 110 may include one or more types of network devices (not shown), which may perform different NFs.

In some embodiments, the networks 110 may comprise a 5G NR or an LTE access network (e.g., an evolved packet core (EPC) network) among others. In this regards, the networks 110 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 114. For example, a logical network may be a Mobile Private Network (MPN) configured for a particular organization. In this example, the user equipment 114a may be configured to connect to one or more particular network slices (i.e., logical networks) in the networks 110.

In the example system 100 of FIG. 1, the networks 110 may facilitate communication within the communication system 100. This disclosure contemplates that the networks 110 may be any suitable network operable to facilitate communication between the server 102 and the user equipment 114. The networks 110 may include any interconnecting system capable of transmitting audio, video, signals, data, messages, or any combination of the preceding. The networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Operation Flow

FIG. 2 illustrates an operation flow 200 performed by a data exchange system 202, a reporting system 204, and at least one of the recipients 150 in accordance with one or more embodiments. The data exchange system 202 and the reporting system 204 may be comprised as sub-systems of the communication system 100. The data exchange system 202 and the reporting system 204 may be at least partially comprised in the server 102. In one or more embodiments, the data exchange system 202 may be configured to perform one or more of the data exchange operations 106 described in reference to FIG. 1, the reporting system 204 may be configured to perform the reporting operations 108 described in reference to FIG. 1. In some embodiments, the recipient 150 may comprise one or more user equipment 114. The operation flow 200 may be performed by the server 102 comprising the data exchange system and the reporting system 204 in communication with the recipient 150. In the non-limiting example of FIG. 2, the server 102 may be communicatively coupled to the recipient 150. In some embodiments, the operations 210-274 maybe performed in the order shown, simultaneously, or any other order.

In one or more embodiments, the data exchange system 202 and the reporting system may be performed by the server processor 122. The server processor 122 may execute the server instructions 142 to operate the server processing engine 120 as an invoice engine performing the data exchange operations 106. The server processor 122 may execute the server instructions 142 to operate the server processing engine 120 as a quotation engine performing the reporting operations 106. In some embodiments, the reporting system 204 is configured to interject data object information 164 before the data object information 164 reaches a recipient 150. The reporting system 204 may interject at any point before the data object information 164 is received by the recipient 150 without relying on intervention and/or collaboration of third parties. These third parties may be organizations configured to provide invoicing services to customers of an organization. In this regard, the reporting system 204 may operate as a layer between the data exchange system 202 and the recipient 150. In this regard, the reporting system 204 may be configured to determine any number of data object modifications 156 before a report 104 is generated for the recipient 150.

The operation flow 200 may start at operation 210, where the data exchange system 202 and the reporting system 204 determine one or more recipients 150 associated with a report 104 to be generated. In one or more embodiments, the data exchange system 202 and the reporting system 204 may be configured to communicate and determine a recipient 150 configured to receive a report 104. In one or more embodiments, the data exchange system 202 and/or the reporting system 204 may determine that the recipient 150 is configured to receive the report 104 when the recipient 150 is found in one or the service directories 148. At operation 212, the data exchange system 202 may be configured to review the service directories 148. The data exchange system 202 may be configured to parse the service directories 148 and match, identify, and/or determine one or more entitlements 154 provided to the recipient 150 by one or more services 152. In some embodiments, a single recipient 150 may be configured to receive multiple reports 104 associated with corresponding user equipment 114. In other embodiments, multiple recipients 150 may be configured to receive a same report 104. At operation 214, the data exchange system 202 may be configured to generate the report information 162. The data exchange system 202 may be configured to determine data object information 164 for each of the entitlements 154 associated with a recipient 150.

At operation 216, the reporting system 204 may be configured to obtain category information from the one or more categories 160. The reporting system 204 may be configured to identify the category information comprising the recipient 150. The reporting system 204 may be associated with multiple categories 160 based on one or more relations and/or conditions applied to the recipient 150. As described above, the categories 160 may be conditions that are unrelated to data exchanges. For example, the categories 160 may comprise an employment category 160 indicating whether the recipient 150 is employed by the organization, a loyalty category 160 indicating a period of time that the recipient 150 has been associated with a given entitlement 154, and a number of service category 160 indicating a number of services 152 associated with the recipient 150 among others. Further, each category 160 may comprise multiple affinity groups 161 related to one another.

At operation 218, the reporting system 204 may be configured to obtain tier information from the one or more tier lists 166. The reporting system 204 may be configured to identify the tier information comprising the recipient 150. The reporting system 204 may be associated with multiple tier lists 166 based on one or more relations and/or conditions applied to the recipient 150. As described above, the tier lists 166 may be conditions that are unrelated to data exchanges. For example, the tier lists 166 may comprise a first set of tiers 168 for one or more of the affinity groups 161 in the employment category 160 indicating locations where the recipient 150 is employed with the organization, a second set of tiers 168 for one or more of the affinity groups 161 in the loyalty category 160 indicating lengths of time that the recipient 150 has been associated with a given entitlement 154, and a third set of tiers 168 for one or more of the affinity groups 161 in the number of service category 160 indicating numbers of services 152 associated with the recipient 150 among others.

The operation flow 200 may continue at operation 230, where the data exchange system 202 is configured to inform the reporting system 204 and/or the recipient 150 about the report 104. The data exchange system 202 and/or the reporting system 204 may be configured to inform the recipient 150 that the report 104 will be generated. At operation 240, the data exchange system 202 is configured to provide the report information 162 to the reporting system 204. The data exchange system 202 may provide data object information 164 for each entitlement 154 associated with the recipient 150. At operation 252, the reporting system 204 may be configured to determine one or more data object information 164 in the report information 162. At operation 254, the reporting system may be configured to determine tone or more data object modifications 156 for the data object information 164 based at least in part upon the category information and the tier information. At operation 256, the reporting system 204 may be configured to generate one or more reports based at least in part upon the data object modifications 156 and any override commands 158. At operation 262, the recipient 150 may prepare to receive one or more incoming reports 182.

The operation flow 200 may conclude at operations 270-274, where the reporting system 204 is configured to trigger delivery of the report 104 to the recipient 150. At operation 270, the reporting system 204 may be configured to present the one or more reports 104 to the data exchange system 202 and/or the recipient 150. In one or more embodiments, the data exchange system 202 may be configured to transmit the reports 104 to the recipient 150 directly and/or indirectly via one or more additional network components. At operation 272, the data exchange system 202 may be configured to update the configuration commands 146. The data exchange system 202 may be configured to save a copy of the report 104. The data exchange system 202 may be configured to update the configuration commands 146 and/or the rules and policies 144. In this regard, the data exchange system 202 may be configured to improve generation of future report information 162. At operation 274, the recipient may be configured to analyze the incoming reports 182.

Example Process to Integrate Data Exchange Operations and Reporting Operations

FIG. 3 illustrate respective example flowchart of the process 300, in accordance with one or more embodiments. Modifications, additions, or omissions may be made to the process 300. The process 300 may include more, fewer, or other operations than those shown above. For example, operations may be performed in parallel or in any suitable order. While at times discussed as the server 102, one or more of the user equipment 114, components of any of thereof, or any suitable system or components of the security system 100 may perform one or more operations of the process 300. For example, one or more operations of the process 300 may be implemented, at least in part, in the form of server instructions 142 of FIG. 1, stored on non-transitory, tangible, machine-readable media (e.g., server memory 140 of FIG. 1 operating as a non-transitory computer readable medium) that when run by one or more processors (e.g., the server processor 122 of FIG. 1) may cause the one or more processors to perform operations described in operations 302-322.

FIG. 3 illustrates an example flowchart of the process 300 to integrate the data exchange operations 106 and the reporting operations 108, in accordance with one or more embodiments. In one or more embodiments, the process 300 comprises operations 302-322 that may be performed by the data exchange system 202 and the reporting system 204 described in reference to FIG. 2.

The process 300 starts at operation 302, where the server 102 is configured to determine a recipient 150 configured to receive a report 104. At operation 304, the server 102 is configured to match the recipient 150 to entitlements 154 in a service directory 148. The entitlements 154 may be configured to indicate data object information 164 for a data object to be received from the recipient 150. At operation 306, the server 102 is configured to obtain a category 160 associated with the recipient 150. At operation 308, the server 102 is configured to obtain tier information (e.g., the tiers 168 of the tier lists 166) associated with the recipient 150. At operation 310, the server 102 may be configured to determine and/or generate a data object modification 156 for the data object information 164 based at least in part upon the category 160 and/or the tier information of the category 160.

The process 300 continues at operation 320, where the server 102 may determine whether the there are additional categories 160 associated with the recipient 150. If the server 102 determines that there are additional categories 160 associated with the recipient 150 (i.e., YES), the process 300 returns to operation 306. In this case, at operation 306, the server 102 is configured to obtain additional category information comprising additional categories 160. If the server 102 determines that there are not additional categories 160 associated with the recipient 150 (i.e., NO), the process 300 proceeds to operation 322. In this case, the process 300 may conclude at operation 322, where the server 102 is configured to generate the report 104 comprising the entitlements 154 and the one or more data object modifications 156.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
    a memory configured to store:
        one or more data exchange operations configured to indicate one or more data objects to be exchanged with at least one user equipment; and
        one or more reporting operations configured to generate one or more data object modifications comprising modifications to the one or more data objects to be exchanged with the at least one user equipment;
    a data exchange system comprising at least one first processor communicatively coupled to the memory, and configured to:
        identify a first user equipment configured to receive a first report;
        match the first user equipment to a first plurality of entitlements in a service directory, the first plurality of entitlements indicating one or more connectivity allowances between the first user equipment and one or more resources in a wireless communication network; and
        generate first report information comprising first data object information for a first plurality of data objects associated with the first user equipment, the first data object information comprising baseline values for each of the first plurality of entitlements associated with the first user equipment; and
    a reporting system comprising at least one second processor, communicatively coupled to the data exchange system, and configured to:
        obtain a first category information associated with the first user equipment, the first category information indicating that the first user equipment is part of a first affinity group;
        receive the first report information from the data exchange system;
        in response to receiving the first report information from the data exchange system, determine a first data object modification for a first baseline value in the first data object information corresponding to a first entitlement of the first plurality of entitlements based at least in part upon the first category information;
        generate the first report comprising the first plurality of entitlements and the first data object modification; and
        transmit the first report to the first user equipment.

2. The apparatus of claim 1, wherein:
    the at least one first processor is further configured to:
        identify a second user equipment configured to receive a second report; and
        match the second user equipment to a second plurality of entitlements in the service directory, the second plurality of entitlements indicating second data object information for a second data object associated with the second user equipment; and
    the at least one second processor is further configured to:
        obtain a second category information associated with the second user equipment, the second category information indicating that the second user equipment is part of a second affinity group;
        obtain a third category information associated with the second user equipment, the third category information indicating that the second user equipment is part of a third affinity group;
        receive the second data object information from the data exchange system;
        determine a second data object modification for the second data object information based at least in part upon the second category information;
        determine a third data object modification for the second data object information based at least in part upon the third category information;
        generate the second report comprising the second plurality of entitlements, the second data object modification, and the third data object modification; and
        transmit the second report to the second user equipment.

3. The apparatus of claim 1, wherein:
    the at least one first processor is further configured to:
        identify a second user equipment configured to receive a second report; and
        match the second user equipment to a second plurality of entitlements in the service directory, the second plurality of entitlements indicating second data object information for a second data object associated with the second user equipment; and
    the at least one second processor is further configured to:
        obtain a second category information associated with the second user equipment, the second category information indicating that the second user equipment is part of a second affinity group;
        obtain a first tier information associated with the second user equipment, the first tier information indicating that the second user equipment is part of a predefined subsection of the second affinity group;
        receive the second data object information from the data exchange system;
        determine a second data object modification for the second data object information based at least in part upon the second category information;
        update the second data object modification for the second data object information based at least in part upon the first tier information;
    in response to updating the second data object modification, generate the second report comprising the second plurality of entitlements and the second data object modification; and
        transmit the second report to the second user equipment.

4. The apparatus of claim 1, wherein:
the at least one first processor is further configured to:
identify a second user equipment configured to receive a second report; and
match the second user equipment to a second plurality of entitlements in the service directory, the second plurality of entitlements indicating second data object information for a second data object associated with the second user equipment; and the at least one second processor is further configured to:
obtain a second category information associated with the second user equipment, the second category information indicating that the second user equipment is part of a second affinity group;
obtain a first tier information associated with the second user equipment, the first tier information indicating that the second user equipment is part of a predefined subsection of the second affinity group:
obtain a third category information associated with the second user equipment, the third category information indicating that the second user equipment is part of a third affinity group;
obtain a second tier information associated with the second user equipment, the second tier information indicating that the second user equipment is part of a predefined subsection of the third affinity group;
receive the second data object information from the data exchange system;
determine a second data object modification for the second data object information based at least in part upon the second category information;
update the second data object modification for the second data object information based at least in part upon the first tier information:
determine a third data object modification for the second data object information based at least in part upon the third category information;
update the third data object modification for the second data object information based at least in part upon the second tier information;
in response to updating the second data object modification and updating the third data object modification, generate the second report comprising the second plurality of entitlements, the second data object modification, and the third data object modification; and
transmit the second report to the second user equipment.

5. The apparatus of claim 1, wherein:
the first data object information comprises a cost associated with an entitlement of the first plurality of entitlements; and
the first data object modification comprises a reduction to the cost associated with the entitlement.

6. The apparatus of claim 1, wherein:
the at least one first processor is further configured to:
identify a second user equipment configured to receive a second report; and
match the second user equipment to a second plurality of entitlements in the service directory, the second plurality of entitlements indicating second data object information for a second data object associated with the second user equipment; and the at least one second processor is further configured to:
obtain a second category information associated with the second user equipment, the second category information indicating that the second user equipment is part of a second affinity group;
receive the second data object information from the data exchange system;
determine a second data object modification for the second data object information based at least in part upon the second category information, the second data object modification comprising a first value;
obtain an override command associated with the second user equipment, the override command indicating a third data object modification comprising a second value:
determine whether the first value comprised by the second data object modification is less than the second value comprised by the third data object modification;
in response to determining that the first value comprised by the second data object modification is less than the second value comprised by the third data object modification, generate the second report comprising the second plurality of entitlements and the third data object modification; and
transmit the second report to the second user equipment.

7. The apparatus of claim 1, wherein the first affinity group comprises a plurality of user equipment associated with a predefined organization.

8. A method, comprising:
identifying, by a data exchange system, a first user equipment configured to receive a first report;
matching the first user equipment to a first plurality of entitlements in a service directory, the first plurality of entitlements indicating one or more connectivity allowances between the first user equipment and one or more resources in a wireless communication network;
generate, by a reporting system, first report information comprising first data object information for a first plurality of data objects data object associated with the first user equipment, the first data object information comprising baseline values for each of the first plurality of entitlements associated with the first user equipment;
obtaining a first category information associated with the first user equipment, the first category information indicating that the first user equipment is part of a first affinity group;
receiving, by the reporting system, the first report information from the data exchange system;
in response to receiving the first report information from the data exchange system, determining a first data object modification for a first baseline value in the first data object information corresponding to a first entitlement of the first plurality of entitlements based at least in part upon the first category information;
generating the first report comprising the first plurality of entitlements and the first data object modification; and
transmitting the first report to the first user equipment.

9. The method of claim 8, further comprising:
identifying a second user equipment configured to receive a second report;
matching the second user equipment to a second plurality of entitlements in the service directory, the second plurality of entitlements indicating second data object information for a second data object associated with the second user equipment;

obtaining a second category information associated with the second user equipment, the second category information indicating that the second user equipment is part of a second affinity group;
obtaining a third category information associated with the second user equipment, the third category information indicating that the second user equipment is part of a third affinity group;
determining a second data object modification for the second data object information based at least in part upon the second category information;
determining a third data object modification for the second data object information based at least in part upon the third category information;
generating the second report comprising the second plurality of entitlements, the second data object modification, and the third data object modification; and
transmitting the second report to the second user equipment.

10. The method of claim 8, further comprising:
identifying a second user equipment configured to receive a second report;
matching the second user equipment to a second plurality of entitlements in the service directory, the second plurality of entitlements indicating second data object information for a second data object associated with the second user equipment;
obtaining a second category information associated with the second user equipment, the second category information indicating that the second user equipment is part of a second affinity group;
obtaining a first tier information associated with the second user equipment, the first tier information indicating that the second user equipment is part of a predefined subsection of the second affinity group;
determining a second data object modification for the second data object information based at least in part upon the second category information;
updating the second data object modification for the second data object information based at least in part upon the first tier information;
in response to updating the second data object modification, generating the second report comprising the second plurality of entitlements and the second data object modification; and
transmitting the second report to the second user equipment.

11. The method of claim 8, further comprising:
identifying a second user equipment configured to receive a second report;
matching the second user equipment to a second plurality of entitlements in the service directory, the second plurality of entitlements indicating second data object information for a second data object associated with the second user equipment;
obtaining a second category information associated with the second user equipment, the second category information indicating that the second user equipment is part of a second affinity group;
obtaining a first tier information associated with the second user equipment, the first tier information indicating that the second user equipment is part of a predefined subsection of the second affinity group;
obtaining a third category information associated with the second user equipment, the third category information indicating that the second user equipment is part of a third affinity group;
obtaining a second tier information associated with the second user equipment, the second tier information indicating that the second user equipment is part of a predefined subsection of the third affinity group;
determining a second data object modification for the second data object information based at least in part upon the second category information;
updating the second data object modification for the second data object information based at least in part upon the first tier information;
determining a third data object modification for the second data object information based at least in part upon the third category information;
updating the third data object modification for the second data object information based at least in part upon the second tier information;
in response to updating the second data object modification and updating the third data object modification, generating the second report comprising the second plurality of entitlements, the second data object modification, and the third data object modification; and
transmitting the second report to the second user equipment.

12. The method of claim 8, wherein:
the first data object information comprises a cost associated with an entitlement of the first plurality of entitlements; and
the first data object modification comprises a reduction to the cost associated with the entitlement.

13. The method of claim 8, further comprising:
identifying a second user equipment configured to receive a second report;
matching the second user equipment to a second plurality of entitlements in the service directory, the second plurality of entitlements indicating second data object information for a second data object associated with the second user equipment;
obtaining a second category information associated with the second user equipment, the second category information indicating that the second user equipment is part of a second affinity group;
determining a second data object modification for the second data object information based at least in part upon the second category information, the second data object modification comprising a first value;
obtaining an override command associated with the second recipient user equipment, the override command indicating a third data object modification comprising a second value;
determining whether the first value comprised by the second data object modification is less than the second value comprised by the third data object modification;
in response to determining that the first value comprised by the second data object modification is less than the second value comprised by the third data object modification, generating the second report comprising the second plurality of entitlements and the third data object modification; and
transmitting the second report to the second user equipment.

14. The method of claim 8, wherein the first affinity group comprises a plurality of user equipment associated with a predefined organization.

15. A non-transitory computer readable medium storing instructions that when executed by a processor cause the processor to:

identify a first user equipment configured to receive a first report;
match the first user equipment to a first plurality of entitlements in a service directory, the first plurality of entitlements indicating one or more connectivity allowances between the first user equipment and one or more resources in a wireless communication network;
generate first report information comprising first data object information for a first data object associated with the first user equipment, the first data object information comprising baseline values for each of the first plurality of entitlements associated with the first user equipment;
obtain a first category information associated with the first user equipment, the first category information indicating that the first user equipment is part of a first affinity group;
determining a first data object modification for a first baseline value in the first data object information corresponding to a first entitlement of the first plurality of entitlements based at least in part upon the first category information;
generating the first report comprising the first plurality of entitlements and the first data object modification; and
transmitting the first report to the first user equipment.

16. The non-transitory computer readable medium of claim 15, wherein the instructions further cause the processor to;
identify a second user equipment configured to receive a second report;
match the second user equipment to a second plurality of entitlements in the service directory, the second plurality of entitlements indicating second data object information for a second data object associated with the second user equipment;
obtain a second category information associated with the second user equipment, the second category information indicating that the second user equipment is part of a second affinity group;
obtain a third category information associated with the second user equipment, the third category information indicating that the second user equipment is part of a third affinity group;
determine a second data object modification for the second data object information based at least in part upon the second category information;
determine a third data object modification for the second data object information based at least in part upon the third category information;
generate the second report comprising the second plurality of entitlements, the second data object modification, and the third data object modification; and
transmit the second report to the second user equipment.

17. The non-transitory computer readable medium of claim 15, wherein the instructions further cause the processor to:
identify a second user equipment configured to receive a second report;
match the second user equipment to a second plurality of entitlements in the service directory, the second plurality of entitlements indicating second data object information for a second data object associated with the second user equipment;
obtain a second category information associated with the second user equipment, the second category information indicating that the second user equipment is part of a second affinity group;
obtain a first tier information associated with the second user equipment, the first tier information indicating that the second user equipment is part of a predefined subsection of the second affinity group;
determine a second data object modification for the second data object information based at least in part upon the second category information;
update the second data object modification for the second data object information based at least in part upon the first tier information;
in response to updating the second data object modification, generate the second report comprising the second plurality of entitlements and the second data object modification; and
transmit the second report to the second user equipment.

18. The non-transitory computer readable medium of claim 15, wherein the instructions further cause the processor to:
identify a second user equipment configured to receive a second report;
match the second user equipment to a second plurality of entitlements in the service directory, the second plurality of entitlements indicating second data object information for a second data object associated with the second user equipment;
obtain a second category information associated with the second user equipment, the second category information indicating that the second user equipment is part of a second affinity group;
obtain a first tier information associated with the second user equipment, the first tier information indicating that the second user equipment is part of a predefined subsection of the second affinity group;
obtain a third category information associated with the second user equipment, the third category information indicating that the second user equipment is part of a third affinity group;
obtain a second tier information associated with the second user equipment, the second tier information indicating that the second user equipment is part of a predefined subsection of the third affinity group;
determine a second data object modification for the second data object information based at least in part upon the second category information;
update the second data object modification for the second data object information based at least in part upon the first tier information;
determine a third data object modification for the second data object information based at least in part upon the third category information;
update the third data object modification for the second data object information based at least in part upon the second tier information;
in response to updating the second data object modification and updating the third data object modification, generate the second report comprising the second plurality of entitlements, the second data object modification, and the third data object modification; and
transmit the second report to the second user equipment.

19. The non-transitory computer readable medium of claim 15, wherein:
the first data object information comprises a cost associated with an entitlement of the first plurality of entitlements; and
the first data object modification comprises a reduction to the cost associated with the entitlement.

20. The non-transitory computer readable medium of claim 15, wherein the instructions further cause the processor to:
- identify a second user equipment configured to receive a second report;
- match the second user equipment to a second plurality of entitlements in the service directory, the second plurality of entitlements indicating second data object information for a second data object associated with the second user equipment;
- obtain a second category information associated with the second user equipment, the second category information indicating that the second user equipment is part of a second affinity group;
- determine a second data object modification for the second data object information based at least in part upon the second category information, the second data object modification comprising a first value;
- obtain an override command associated with the second user equipment, the override command indicating a third data object modification comprising a second value;
- determine whether the first value comprised by the second data object modification is less than the second value comprised by the third data object modification;
- in response to determining that the first value comprised by the second data object modification is less than the second value comprised by the third data object modification, generate the second report comprising the second plurality of entitlements and the third data object modification; and
- transmit the second report to the second user equipment.

* * * * *